INVENTOR
S. C. KITSOPOULOS
BY
R.O. Nimz
ATTORNEY

HOLD AMPLIFIER

COMMON AMPLIFIER

United States Patent Office 3,444,326

Patented May 13, 1969

3,444,326

TIME DIVISION SWITCHING CIRCUIT

Sotirios C. Kitsopoulos, Summit, N.J., assignor to Bell Telephone Laboratories, Incorporated, New York, N.Y., a corporation of New York Filed Dec. 24, 1964, Ser. No. 420,975
Int. Cl. H04j 3/10
U.S. Cl. 179—15 3 Claims

ABSTRACT OF THE DISCLOSURE

A time division switching system using a common bus that includes an amplifier circuit is disclosed. The output of the amplifier circuit is applied to a hold circuit, contained in each output terminal, which comprises a tunable series resonant circuit and a high input impedance amplifier circuit. The combination reduces crosstalk, compensates for frequency roll-off and reduces power losses resulting from the use of the sampling technique.

This invention relates to time division switching systems and, more particularly, to improvements in the operating characteristics of high speed time division switching circuits.

Time division switching systems heretofore proposed have had several disadvantages which severely limited the speed at which they operate. The rapidity of the switching elements themselves, for example, sets an upper limit on the speed of the system. More important, however, in the operation of a time division switching system are the problems arising from high losses through the system (due to the low duty factor sampling) and crosstalk on the common bus. As is well known, a time division switch operates to connect two transmission paths together by simultaneously gating these paths to a common bus. A short sample of the signal is then transmitted between the two paths. The sampling must take place fast enough to allow all other pairs of transmission paths to be connected together in a similar manner and to return to the first pair within the required sampling period. It has been determined that each signal must be sampled at a rate equal to twice the highest frequency component in the signal.

Since each signal is sampled for only a small fraction of the total time, most of the energy in the signal is not transmitted. Attempts to increase the signal level at the switch output by increasing the signal input level obviously increases the signal level at the switching elements, further increasing the distortions due to crosstalk.

Because the common bus is connected to a large number of electronic switches, a large amount of stray capacitance exists between the bus and the signal reference level. A charge is built up on this capacitance each time a signal is sampled. If this charge is not fully discharged before the next signal is sampled, distortion of the second signal occurs in the form of crosstalk. It has heretofore been necessary in large time division switching systems to provide gates to clamp the bus to a reference level between signal samples and thus discharge the stray capacitances. This, of course, complicates the switching requirements and, furthermore, introduces highly sensitive timing requirements.

It is an object of the present invention to simplify the construction of, and, at the same time, improve the operation of, high speed time division switching systems.

It is a more specific object of the invention to reduce or eliminate the signal loss through a time division switch.

It is another object of the invention to reduce or eliminate crosstalk in a time division switch without bus clamping.

It is yet another object of the invention to provide low voltage level, current mode switching into the common bus of a time division switching system.

In accordance with the present invention, these and other objects are achieved by providing a low impedance common amplifier in the common bus and utilizing sample and hold techniques to supplement the switching function. The low impedance amplifier provides extremely low input and output impedances, thus quickly discharging the stray bus capacitance. In addition, the placement of this amplifier in the common bus splits the capacitance into two smaller parts, thus further aiding in the intersample discharge.

The provision of very low impedance on the bus further allows the use of low voltage level, current-mode switching into the bus, permitting switching elements to be used in the linear portion of their operating characteristics. Finally, the common amplifier can provide some common gain to overcome losses in the switch.

In order to fully overcome the large sampling losses in the switch, however, sample and hold techniques are used. Instead of switching each sample onto the first capacitor of an output low-pass filter, the sample is applied to a series resonant circuit including a hold capacitor followed by a hold amplifier. Since each sample is held until the next sample arrives, the hold amplifier can provide large amounts of power gain at the switch output. Moreover, due to the tuning of the series resonant circuit, this gain is dependent on the frequency of the input signal. The Q of this circuit can be selected to so shape the gain-frequency characteristic as to partially compensate for roll-off in the low-pass filters at the inputs and outputs of the switching system. This gain compensation permits the use of inexpensive low-pass filters and thus reduces the cost of the per line equipment.

These and other objects and features, the nature of the present invention and its various advantages, may be more readily understood upon consideration of the attached drawings and of the following detailed description of the drawings.

Figures 1, 2:
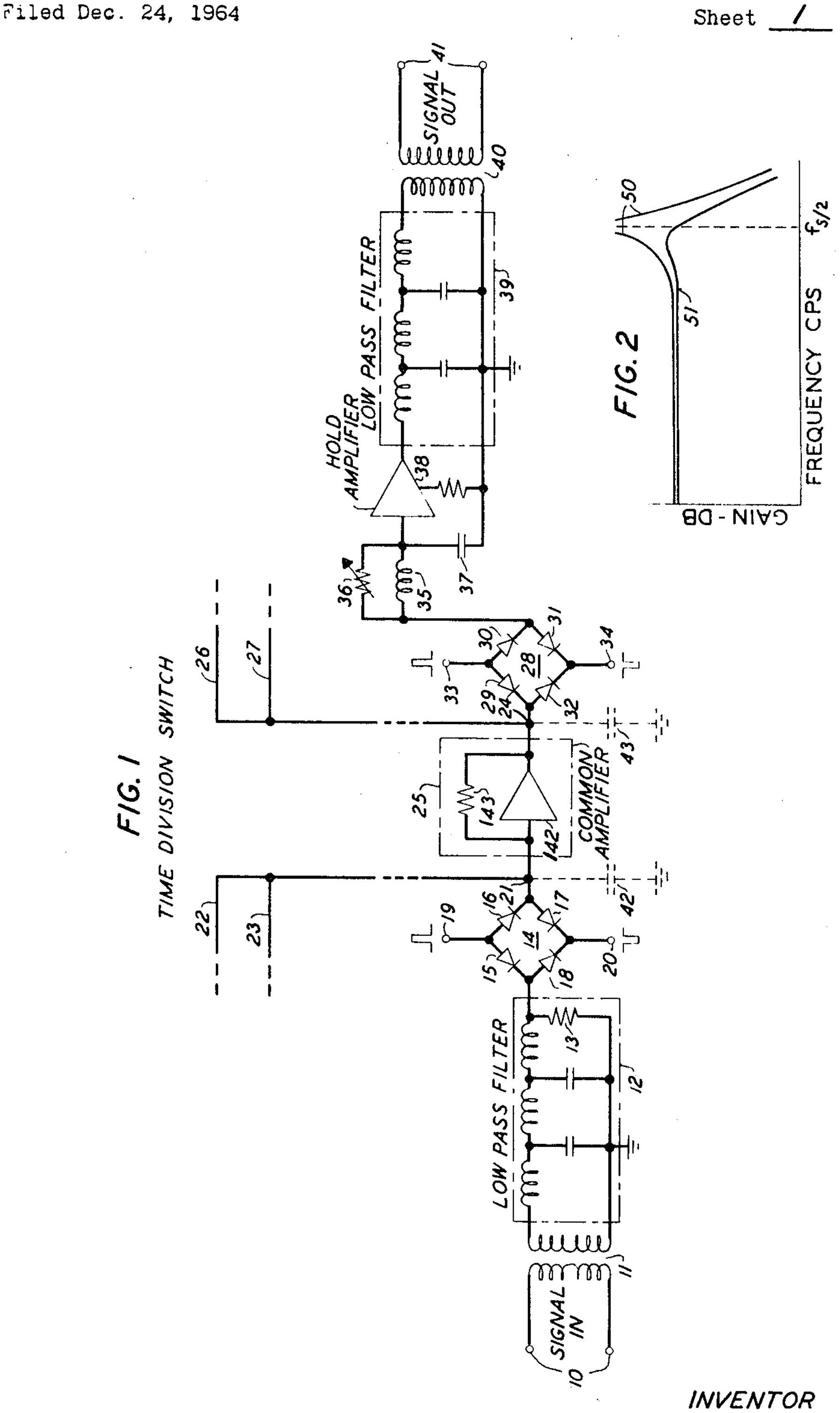
FIG. 1 is a simplified schematic diagram of a time division switching system in accordance with the present invention.
FIG. 2 is a graphical representation of the gain versus frequency characteristic of a resonant sample and hold circuit such as that shown in FIG. 1.

Referring more particularly to FIG. 1 of the drawings, there is shown a general schematic diagram of a time division switching system including a plurality of signal input terminals and a plurality of signal output terminals. Since all of the switching paths are identical, only one such path has been shown in detail. Signal input terminals 10 are connected to input transformer 11 which, in turn, is connected to a low-pass filter circuit 12. Filter circuit 12 is terminated by resistance 13, equal to the characteristic impedance of the filter circuit.

Connected to the output of filter circuit 12 is a diode gating circuit 14 comprising four semiconductor diodes 15 through 18 arranged in a bridge circuit such that a positive potential applied between control terminals 19 and 20 places all of these diodes in their low impedance, forward-conducting state. On the other hand, a negative potential applied between terminals 19 and 20 reverse-biases diodes 15 through 18 to place them in a high resistance, nonconducting condition. In the former case, diode switch 14 is closed and in the latter case switch 14 is opened. Under normal operation, a positive pulse of voltage, as illustrated, is applied between terminals 19 and 20 for the sampling interval.

The output of diode gate 14 is applied to common node 21 to which the outputs of diode gates similar to diode gate 14 are likewise applied by way of leads 22, 23, et cetera. The diode gate, low-pass filter, input transformer and signal input terminals connected to leads 22, 23, et cetera have not been illustrated, but would in practice be identical to those shown in connection with diode gate 14.

Node 21 comprises one terminus of a time division bus over which samples from each of the signal input terminals are transmitted. The other terminus of this bus is located at node 24. Between these two nodes, a common amplifier 25 is located. In accordance with the present invention, amplifier 25 provides an extremely low input impedance and an extremely low output impedance. As one example of such an amplifier, a shunt-feedback operational type amplifier is illustrated in FIG. 1. Other types of low input impedance and low output impedance amplifiers would be equally suitable for the common amplifier in accordance with the present invention. The term "operational type" amplifier is used to stress the similarity of this amplifier to direct current operational amplifiers commonly employed in analog computers. This amplifier 25, however, is a wide-band pulse amplifier rather than a direct current amplifier. In other respects, the amplifiers are quite similar.

Node 24 is connected to a plurality of diode gates such as diode gate 28 or similar diode gates connected to leads 26, 27, et cetera. Instead, node 24 could be connected to a time division multiplex transmission system with, for example, a common pulse encoder at the output of amplifier 25.

Diode gate 28 comprises four semiconductor diodes 29 through 32 arranged in a bridge circuit such that a positive voltage applied between terminals 33 and 34 serves to place all of these diodes in a forward-conducting, low-resistance state. A negative voltage, on the other hand, applied between terminals 33 and 34, serves to reverse bias diodes 29 through 32, and thus turn switch 28 off.

The output of diode gate 28 is connected to inductor 35, bypassed by a variable resistor 36. The other terminal of inductor 35 is connected to a holding capacitor 37 followed by a holding amplifier 38. Holding amplifier 38 may be any amplifier having a high input impedance and, for convenience, is illustrated in FIG. 1 as a series-feedback type amplifier. Other types of high input impedance amplifiers would be equally suitable for holding amplifier 38. The output of holding amplifier 38 is applied to a low-pass filter circuit 39 which, in turn, is connected to output transformer 40. The secondary winding of output transformer 40 is connected to output terminals 41.

In operation, input signals applied to terminals 10 are band-limited by low-pass filter 12 and applied across resistor 13. During a small portion of each cycle of the time division switch, diode gate 14 is closed to connect filter circuit 12 to common amplifier 25. Since low-pass filter 12 is arranged to have an inductor as the output element, low-pass filter 12 operates essentially as a constant current source into diode switch 14. Furthermore, since common amplifier 25 has a very low input impedance, diode gate 14 operates in the current mode to deliver a pulse of current from filter circuit 12 to amplifier 25. Since the duty factor of the control pulses to gate 14 is extremely small, the load on low-pass filter 12 is essentially that provided by resistor 13, and hence is substantially constant and equal to the characteristic impedance of the filter.

Since a large number of leads 22, 23, et cetera and an equally large number of diode gates similar to diode gate 14 are connected together at node 21, a fairly large amount of stray capacitance 42 exists between node 21 and ground. Similarly, a fairly large amount of stray capacitance 43 exists between node 24 and ground. In the absence of the common amplifier 25, stray capacitances 42 and 43 are additive. Current samples delivered to the common bus tend to charge this stray capacitance. On the arrival of the next signal sample from one of the other diode gates, this stray capacitance may not have as yet been fully discharged, and hence distortions occur in the succeeding signal samples. Such distortions, called "crosstalk," tend to be cumulative and are directly related to the amount of stray capacitance.

In accordance with the present invention, common amplifier 25 is provided to split the stray capacitances 42 and 43 apart. Thus, the total capacitance which must be discharged on any side of the common amplifier is only part of the total capacitance on the time division bus. Moreover since common amplifier 25 is designed to have an extremely low input impedance and an extremely low output impedance, capacitances 42 and 43 are quickly discharged. The cross-talk distortion due to residual charges on these capacitances is therefore substantially eliminated. In addition, amplifier 25 can be designed to provide a certain amount of gain in the common transmission path. The single amplifier may therefore provide gain for all of the time-divided signaling paths. In general, such gain can be obtained more economically in a common amplifier than any individual amplifiers in each signal input or output path.

At the output of the time division switch, the inductor 35 and capacitor 37 form a series resonant circuit tuned to have a period of oscillation equal to twice the duration of closure of the diode switch 28. This provides resonant transfer of the signal sample from amplifier 25 through gate 28 to capacitor 37. This resonance reduces the necessary current capability of the common amplifier and switching circuit 28, and furthermore, allows some shaping of the gain versus frequency characteristic of the switching circuit. This can be better seen in connection with FIG. 2.

Referring then more particularly to FIG. 2, there is shown a graphical representation of the gain versus frequency characteristic of a resonant transfer circuit such as that shown in FIG. 1. Assuming for the moment that the resistance in the resonant transfer circuit is small enough to be negligible, the gain characteristic of the circuit would be similar to that shown in curve 50 of FIG. 2. Thus, in the lower frequency ranges, the circuit provides a flat frequency response. For input signals at one-half the sampling rate, $f_s$, of the diode gates 14 and 28, the gain of the circuit approaches infinity, while at the sampling rate $f_s$ the circuit provides an infinite attenuation. The following examples may be helpful in understanding this operation.

The voltage swing on capacitor 37 during each operation of the switching circuit is equal to twice the voltage across inductor 35 at the instant the switch 28 closes if the resistance of the circuit is assumed to be zero. This voltage, in turn, is determined by the previously obtained voltage on capacitor 37 and the amplitude of the signal sample delivered by switch 28. At zero frequency, constant amplitude and constant polarity pulse signals are supplied by diode gate 28. The first such pulse charges capacitor 37 to twice the input voltage. When the second pulse arrives, capacitor 37 still holds substantially the same voltage and hence the voltage across inductor 35 is of the same magnitude but of reverse polarity. The resulting current flow discharges capacitor 37. Successive samples thus alternately charge and discharge capacitor 37 at the sampling frequency. Since low-pass filter 39 removes the sampling frequency, the output to transformer 40 is a constant direct current voltage.

At the other extreme, if the input signal frequency is exactly one-half the sampling frequency, successive signal samples will have opposite polarities. As before, on the first sample, capacitor 37 charges to twice the sample voltage. On the next sample, the sample itself is negative while the voltage on capacitor 37 is two units in a positive direction. The difference, appearing across inductor 35, is three units in magnitude and of a polarity to discharge capacitor 37 to zero and recharge capacitor 37 in a negative direction to a value of four units (the total swing being six units, twice the initial voltage across inductor 35). In a similar manner, the next succeeding sample charges capacitor 37 in a positive direction to a magnitude of six units (total swing of ten units). In this way, succeeding samples produce on capacitor 37 an ever increasing alternating voltage, resulting in the infinite gain at frequency $f_s/2$ on curve 50 in FIG. 2. The sampling frequency is, of course, removed by filter 39.

It is apparent, however, that some resistance exists in the resonant transfer circuit and hence infinite gain can never be achieved in a practical circuit. In fact, a variable resistor 36 is connected across inductor 35 to provide a means for detuning, i.e., lowering the Q, of the resonant circuit. In this case, a gain-versus-frequency characteristic such as curve 51 in FIG. 2 is obtained. Resistor 36 may be adjusted such that the frequency peaking obtained in the gain characteristic compensates for a major portion of the roll-off of the associated low-pass filters. It is therefore possible to construct the time division switch of FIG. 1 with low-pass filters of simpler and more economical construction than would otherwise be possible.

Returning to FIG. 1, the hold amplifier 38 is designed to have a very high input impedance and thus prevent the voltage built up on capacitor 37 from decaying substantially during the intersample interval. Amplifier 38 delivers to low-pass filter 39 a voltage which is equal to the voltage on capacitor 37, but held at a substantially constant level between succeeding samples. In this way, a large power gain is obtained by means of the hold amplifier, thus compensating for a major portion of the losses due to sampling.

It can be seen from the above description of the time division switching circuit of FIG. 1 that significant advantages are obtained by the circuit arrangement disclosed. More particularly, the placement on the time division bus of a common amplifier having extremely low input impedance and extremely low output impedance virtually eliminates crosstalk problems between the different time-divided channels on the common bus. Terminating the low-pass filter 12 with an inductor section and a terminating resistor 13 improves the impedance characteristics looking into terminals 10. Moreover, this arrangement provides an essentially constant current source for diode gate 14 which, therefore, operates between a current source at filter 12 and a current sink at amplifier 25. Diode gate 28 operates in the resonant voltage transfer mode between the output of amplifier 25 and the resonant circuit including inductor 35 and capacitor 37.

It will be noted that, unlike conventional resonant transfer circuits, the resonant transfer in FIG. 1 is not obtained between the output capacitance of an input filter and the first capacitance of the output filter. Instead, resonant transfer takes place between the common amplifier 25 and a hold capacitor 37. Significant power amplification is possible because of the hold technique herein utilized. Finally, the overall gain-versus-frequency characteristic can be adjusted by resistor 36 to compensate for high frequency roll-off in the associated low-pass filters.

The common amplifier 25, as illustrated in FIG. 1, is a shunt-feedback operational-type amplifier. That is, amplifier 25 includes a very high gain amplifying circuit 142 and a resistance feedback element 143 between the input and output terminals. It can be seen that, no matter what the input current, the input voltage must remain extremely small since the high gain would result in a large negative feedback preventing voltage increases. The input impedance is therefore extremely low and essentially all of the input current flows through the feedback resistor 43. The output voltage is therefore equal to the input current times the value of resistor 143. The output impedance is also extremely low. Such an amplifier therefore has the required low input and low output impedances. However, the presence of relatively high capacitances at both output and input of this amplifier raises stability problems which render the design of the circuit difficult. Other circuit arrangements can be used to provide the same impedance levels and yet avoid the stability problem. Two such other circuits are illustrated in FIGS. 3 and 4.

Figure 3:
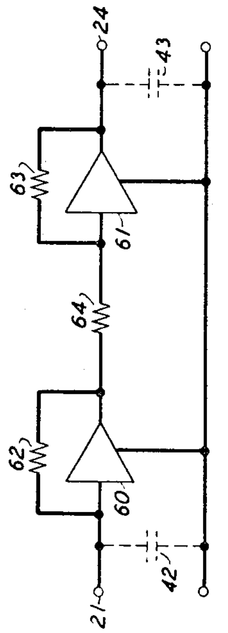
FIG. 3 is a schematic circuit diagram of one form of low impedance amplifier suitable for use as the common amplifier in FIG. 1.

Referring then to FIG. 3, there is shown a general circuit diagram of two cascaded shunt negative feedback operational type amplifiers suitable for the common amplifier 25 in FIG. 1. The amplifier in FIG. 3 comprises two high gain amplifiers 60 and 61 having feedback resistors 62 and 63, respectively. Interposed between these two amplifiers is the resistor 64 which provides a resistive load for the first amplifier and a resistive source for the second, thereby reducing the tendency of the single amplifier to oscillate. The output voltage of the overall amplifier of FIG. 3 is essentially equal to the input current multiplied by the ratio of the values of resistors 63 and 64 times the value of resistor 62, i.e., $R_{62}\,R_{63}/R_{64}$.

Figure 4:
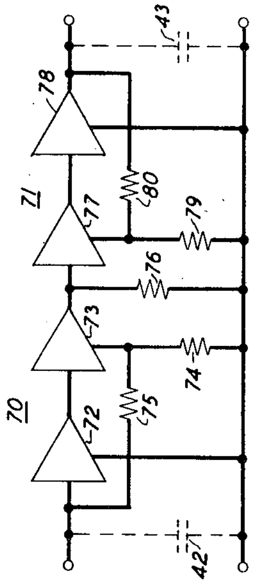
FIG. 4 is a schematic circuit diagram of another form of low impedance amplifier suitable for use as the common amplifier in FIG. 1.

In FIG. 4 there is shown yet another amplifier arrangement suitable for use as the common amplifier 25 in FIG. 1. The amplifier of FIG. 4 comprises two cascaded amplifier sections 70 and 71. Amplifying section 70 includes two high gain amplifying circuits 72 and 73. Amplifier 70 includes a series feedback resistor 74 and a shunt feedback resistor 75. As before, the shunt-feedback through resistor 75 provides very low input impedance. The series feedback through resistor 74, on the other hand, provides a very high output impedance. This amplifier operates into a load resistor 76. The overall current gain of amplifying section 70 is essentially equal to the ratio of resistors 75 and 74, plus one, i.e., $$\left(\frac{R_{75}}{R_{74}}+1\right)$$

Amplifying section 71 likewise includes two high gain amplifying circuits 77 and 78. Series feedback is applied at the input by virtue of series feedback resistor 79 while shunt-feedback is applied at the output by virtue of shunt feedback resistor 80. The series feedback at the input provides a high input impedance while the shunt feedback at the output provides an extremely low output impedance. Resistor 76 provides a nonreactive interface between amplifying sections 70 and 71 and thereby simplifies the design of stable amplifying sections. At the same time, both of the external terminals provide the required low impedance. The voltage gain of amplifying section 71 is substantially equal to the ratio of resistors 80 and 79 plus one, i.e., $$\left(\frac{R_{80}}{R_{79}}+1\right)$$

It can be seen that the gain of the overall amplifier of FIG. 4 can be easily adjusted to provide any desired value merely by adjusting the values of resistors 74, 75, 76, 79 and 80. This gain, supplied in the common bus, is provided for all of the switched signal paths and hence is less expensive than the same amount of gain provided on a per line basis.

Figure 5:
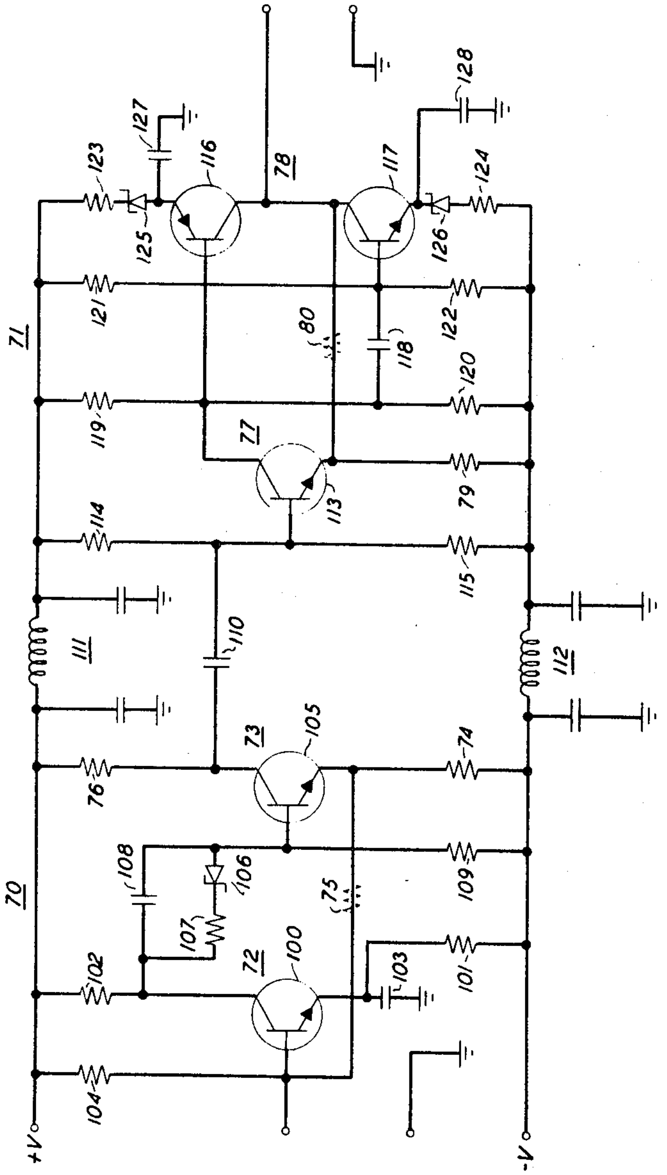
FIG. 5 is a detailed schematic diagram of the common low-impedance feedback amplifier, shown in block form in FIG. 4, and suitable for use in the time division switching system of FIG. 1.

A specific circuit arrangement of a common amplifier suitable for use as amplifier 25 in FIG. 1 and in accordance with the circuit diagram of FIG. 4 is shown in FIG. 5. Referring then to FIG. 5, there is shown a transistor amplifier having low input and low output impedances and stable operating characteristics throughout a wide frequency range. It can be seen in FIG. 5 that the amplifier 72 comprises a transistor 100 to the base of which the input samples are applied. Transistor 100 has a biasing resistor 101 connected to the emitter thereof and a load resistor 102 connected to the collector. Biasing resistor 101 is bypassed by capacitor 103 while the base of transistor 100 is biased by a resistor 104.

The collector of transistor 100 is direct current coupled to the base of transistor 105, forming amplifying circuit 73, through Zener diode 106. Zener diode 106 is a constant voltage breakdown diode of the well-known type and provides the appropriate direct current level at the base of transistor 105. Resistor 107 and capacitor 108 reduce the noise introduced by diode 106 while resistor 109 provides a current path for the current necessary to maintain diode 106 in the breakdown region.

Transistor 105 has a series feedback resistor 74 connected in the base emitter circuit. This resistor provides large amounts of negative feedback for transistor 105 to obtain a high output impedance. The shunt feedback resistor 75, shown in dashed lines in FIG. 5, is actually omitted since no gain is required in the amplifier of FIG. 5.

Amplifying section 71 is coupled to amplifying section 70 by way of coupling capacitor 110. The bias supplies for the two amplifying sections 70 and 71 are separated by low-pass filters 111 and 112 to isolate more completely these two sections and thus prevent inadvertent feedback and crosstalk paths.

Amplifier 77 comprises a transistor amplifier 113 having the series feedback resistor 79 connected to the emitter thereof. Resistors 114 and 115 provide the appropriate direct current bias on the base of transistor 113.

The output amplifier 78 is a two transistor, complementary type push-pull amplifier including p-n-p transistor 116 and n-p-n transistor 117. The output at the collector of transistor 113 is applied to the bases of both transistors 116 and 117, directly to the base of transistor 116 and through coupling capacitor 118 to the base of transistor 117. Resistors 119 and 120 provide the appropriate bias for the base of transistor 116 while resistors 121 and 122 provide the appropriate bias for the base of transistor 117. Current limiting load resistors 123 and 124 are connected in the respective emitter circuits of transistors 116 and 117. Voltage level setting Zener diodes 125 and 126 are likewise connected in the respective emitter circuits of transistors 116 and 117.

The low impedance output of the circuit is taken from the common connection of the collectors of transistors 116 and 117. The shunt feedback resistor 80, shown in dashed lines in FIG. 5, is actually omitted in the feedback path since no gain is required. Bypass capacitors 127 and 128 are connected to the respective emitters of transistors 116 and 117.

It can be seen that the amplifier circuit of FIG. 5 provides low input and low output impedances for use in the common bus of a time division switching system such as that shown in FIG. 1. Moreover, the circuit of FIG. 5 is stable over large ranges of frequency and can be made to provide significant amounts of gain if desired. An amplifier suitable for a time division switch including one hundred time slots, and a sampling rate of 10,000 pulses per second for each signal source, and operating between 600 ohm terminations has the following component values:

| | |
|---|---|
| Transistor: | |
| **100** | 2N917 |
| **105, 113** | 2N3137 |
| **116** | 2N1645 |
| **117** | 2N3327 |
| Diode: | |
| **106** | 1N675 |
| **125, 126** | 1N1744 |

| | | |
|---|---|---|
| Resistor: | | |
| **76** | ohms | 650 |
| **101** | do | 3,900 |
| **102** | do | 680 |
| **104** | do | 82,000 |
| **107** | do | 24 |
| **109** | do | 1,200 |
| **114** | do | 6.810 |
| **115** | do | 6,810 |
| **119** | do | 470 |
| **120** | do | 3,300 |
| **121** | do | 3,000 |
| **122** | do | 1,500 |
| **123** | do | 100 |
| **124** | do | 100 |
| Capacitor: | | |
| **103** | microfarads | 100 |
| **108** | do | 100 |
| **110** | do | 40 |
| **118** | do | 40 |
| **127** | do | 40 |
| **128** | do | 40 |
| +v. | | +24 |
| −v. | | −24 |

It is to be understood that the above suggested component values are merely illustrative, and that the circuit is operative with many other component values. Moreover, other circuit forms, such as those shown in FIGS. 1 and 3, could likewise be used.

Figure 6:
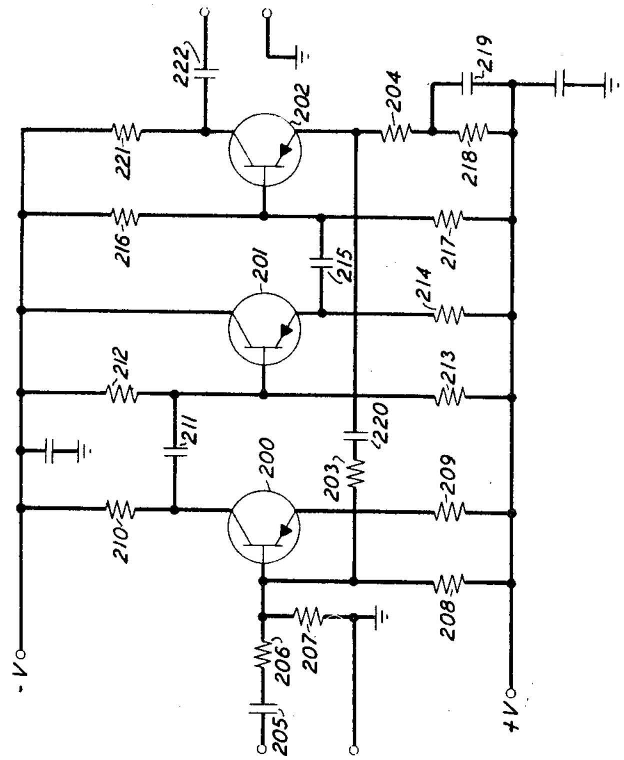
FIG. 6 is a detailed schematic diagram of a hold amplifier suitable for use in the time division switching system of FIG. 1.

In FIG. 6 there is shown a detailed circuit diagram of a hold amplifier suitable for use as amplifier 38 in FIG. 1. The amplifier of FIG. 6 is essentially a shunt-series feedback amplifier such as amplifying section 70 in FIG. 4, comprising transistors 200, 201 and 202. The high input impedance needed for holding is actually obtained by resistor 206 in order to make it independent of transistor gain variations. The shunt feedback resistor 203 provides negative feedback to the input of transistor 200 while the series feedback resistor 204 provides negative feedback to the transistor 202.

The input pulse samples, held for the entire intersample interval on capacitor 37 (FIG. 1), are applied to an input circuit including capacitor 205 and resistor 206. The input circuit including capacitor 37 (FIG. 1), capacitor 205 and resistor 206 has a time constant which is long compared to the intersample period and hence the sample magnitude is held substantially constant for the sample interval.

The base of transistor 200 is approximately biased by biasing resistor 208 together with resistor 207. A small amount of series feedback is provided in the emitter circuit of transistor 200 by way of resistor 209. The collector of transistor 200 is biased through load resistor 210.

The output at the collector of transistor 200 is transferred through coupling capacitor 211 to the base of transistor 201. This base is biased by resistors 212 and 213. Transistor 201 is operated as an emitter follower, having emitter load resistor 214.

The output from the emitter of transistor 201 is coupled by coupling capacitor 215 to the base of transistor 202. This base is biased by resistors 216 and 217 to the appropriate operating range. The series feedback resistor 204 is connected to the emitter of transistor 202 in series with a self-biasing circuit including resistor 218 and capacitor 219. The shunt feedback circuit, including shunt feedback resistor 203 in series with shunt feedback capacitor 220, is connected between the emitter of transistor 202 and the base of transistor 200. Load resistor 221 connects the collector of transistor 202 to the supply potential. The output of the hold amplifier of FIG. 6 is taken from the collector of transistor 202 by way of coupling capacitor 222. This output is supplied to the output low-pass filter 39 as shown in FIG. 1.

The hold amplifier of FIG. 6 is one arrangement suitable for use in the time division switching circuit of FIG. 1, having a sufficiently high input impedance by virtue of input resistor 206. Other forms of amplifier circuits having this property would be equally suitable. A hold amplifier in accordance with FIG. 6 and suitable for a time division switch including one hundred time slots, a sampling rate of 10,000 pulses per second and operating between 600 ohm terminations, has the following component values.

| | | |
|---|---|---|
| Transistor: | | |
| **200** | | W. E. type 12G |
| **201** | | W. E. type 12G |
| **202** | | W. E. type 31A |
| Resistor: | | |
| **203** | ohms | 25,000 |
| **204** | do | 31.6 |
| **206** | do | 51,000 |
| **207** | do | 27,000 |
| **208** | do | 5,000 |
| **209** | do | 50 |
| **210** | do | 10,000 |
| **212** | do | 24,000 |
| **213** | do | 430,000 |
| **214** | do | 5,000 |
| **216** | do | 6,000 |
| **217** | do | 9,000 |
| **218** | do | 820 |
| **221** | do | 600 |
| Capacitor: | | |
| **205** | microfarad | 1 |
| **211** | do | 1 |
| **215** | do | 2 |
| **219** | do | 100 |
| **220** | do | 1 |
| **222** | do | 40 |
| +V | | +24 |
| −V | | −24 |

It is to be understood that the above-suggested component values are merely illustrative, and that the circuit is operative with many other component values. Furthermore, it is to be understood that all of the above-described arrangements are likewise merely illustrative of numerous and varied other arrangements which could represent applications of the principles of the invention. Such other arrangements may readily be devised by those skilled in the art without departing from the spirit or scope of the invention.

What is claimed is:

1. A time division switching system comprising a plurality of incoming communication paths, a plurality of outgoing communication paths, a common time division bus, two cascaded amplifier circuits in said common bus, one of said amplifier circuits comprising a first two high-gain amplifiers connected in cascade, the second of said first two amplifiers having a first series feedback resistor connecting said second amplifier to a reference potential, a first shunt feedback resistor connected from said first series feedback resistor to the input of the first of said first two amplifiers, the other of said amplifying circuits comprising a second two high-gain amplifiers connected in cascade, a second series feedback resistor connecting the first of said second two amplifiers to said reference potential, and a second shunt feedback resistor connecting said second series resistor to the output of the second of said second two amplifiers, selectively operable gating means connecting each of said communication paths to said bus, and a hold circuit in each of said output communication paths.

2. A time division switching system comprising a plurality of signal sources, a plurality of signal utilization means, a common time divided bus extending between said sources and said utilization means, means for selectively and recurrently connecting source-utilization means pairs to said bus, each of said signal sources including low-pass filtering means terminated by an impedance having a series inductance and a shunt resistance, each of said utilization means including a series resonant circuit, a high impedance amplifier connected to the capacitive element of said series resonant circuit, and low-pass filtering means connected to said high impedance amplifier, a low impedance amplifier connected in said common bus, and means for adjusting the Q of each of said series resonant circuits to provide a substantially flat gain-versus-frequency characteristic for the corresponding source utilization means pair.

3. In combination, a plurality of signal sources, means for band-limiting each of said signal sources to a preselected range of frequencies, a plurality of utilization means, means for sampling each of said signal sources at a rate equal to at least twice said frequency range, a common signal path for samples from each of said signal sources, said signal path including an amplifier providing low impedance terminations at both terminals thereof, means for delivering said signal samples from each said source to a corresponding reactive storage means which comprises a series inductive and capacitive circuit resonant at one-half said sampling rate, and adjustable resistance means connected to said series resonant circuit, means for holding each sample in said reactive storage means until the arrival of the next succeeding sample, and means for band-limiting the signals on each of said reactive storage means to said preselected range.

References Cited

UNITED STATES PATENTS

| | | | |
|---|---|---|---|
| 2,429,613 | 10/1947 | Deloraine et al. | 179—15 |
| 2,927,967 | 3/1960 | Edson | 179—15 |
| 2,962,551 | 11/1960 | Johannesen | 179—15 |
| 3,111,557 | 11/1963 | Scott et al. | 179—15 |

OTHER REFERENCES

A. Palimpsest on the Electronic Analog Art, edited by H. M. Paynter; published by Philbrick Researches, Inc., 1955; pp. 5, 24.

ROBERT L. GRIFFIN, *Primary Examiner.*

WILLIAM S. FROMMER, *Assistant Examiner.*